United States Patent
Bakeev et al.

(10) Patent No.: US 9,719,008 B2
(45) Date of Patent: Aug. 1, 2017

(54) GYPSUM SCALE INHIBITORS FOR ORE SLURRY SYSTEMS IN HYDRO-METALLURGICAL APPLICATIONS

(71) Applicant: Solenis Technologies, L.P., Schaffhausen (CH)

(72) Inventors: Kirill N Bakeev, Newark, DE (US); Andrew M DiMaio, Oxford, PA (US)

(73) Assignee: Solenis Technologies, L.P. (CH)

( * ) Notice: Subject to any disclaimer, the term of this patent is extended or adjusted under 35 U.S.C. 154(b) by 0 days.

(21) Appl. No.: 14/510,616

(22) Filed: Oct. 9, 2014

(65) Prior Publication Data

US 2015/0105303 A1    Apr. 16, 2015

Related U.S. Application Data

(60) Provisional application No. 61/890,998, filed on Oct. 15, 2013.

(51) Int. Cl.
*C09K 8/52*   (2006.01)
*C23F 14/02*  (2006.01)
*C22B 3/02*   (2006.01)

(52) U.S. Cl.
CPC .......... *C09K 8/52* (2013.01); *C22B 3/02* (2013.01); *C23F 14/02* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 4,818,506 A | 4/1989 | Lin et al. | |
| 5,306,429 A | 4/1994 | Wood et al. | |
| 5,368,830 A | 11/1994 | Alfano et al. | |
| 5,454,954 A * | 10/1995 | Alfano | C02F 5/10 210/700 |
| 2013/0090425 A1 * | 4/2013 | Wakao | C08F 2/10 524/556 |

FOREIGN PATENT DOCUMENTS

WO    2013019627    7/2013

OTHER PUBLICATIONS

Emel Akyol et al., "Systematic Structural Determinants of the Effects of Tetraphosphonates on Gypsum Crystallization", Crystal Growth & Design, vol. 9, pp. 5145-5154 (2009) ACS.
He Shiliang et al., "Inhibition of Mineral Scale Precipitation by Polymers", Water Soluble Polymers: Solution Properties and Applications, (Proceedings of a Symposium on Water Soluble Polymers:Solution Properties and Applications) pp. 163-171, 1997.

(Continued)

*Primary Examiner* — Jeffrey Washville
(74) *Attorney, Agent, or Firm* — Joanne Rossi; Michael Herman (57) ABSTRACT

The current technology relates to mining processes and compositions which inhibit the growth of complex scale. More specifically it relates to a process for preventing/inhibiting and/or controlling gypsum scale in aqueous mineral ore slurries, and for inhibiting scale in relatively high solids content environments in industrial mining operations.

9 Claims, 3 Drawing Sheets

(56) References Cited

OTHER PUBLICATIONS

Amjad et al., "Gypsum Scale Formation on Heat Exchanger Surfaces: the Influence of Poly(acrylic acid), poly(aspartic acid), and poly (glutamic acid", ACTA Polytechnica Scandinavica, CH, Chemical Technology Andmetallurgy Series, Finnish Academy of Technical Sciences, Helsinki, FI, vol. 244, 1997.
Weijnen M P C et al., "Adsorption of Phosphonates on Gypsum Crystals" Journal of Crystal Growth, Elsevier, Amsterdam, NL, vol. 79, No. 1-3, 1986.
International Search Report, PCT/US2014/059890, Feb. 5, 2015.

* cited by examiner

GYPSUM SCALE INHIBITORS FOR ORE SLURRY SYSTEMS IN HYDRO-METALLURGICAL APPLICATIONS

This application claims the benefit of U.S. provisional application No. 61/890,998, filed 15 Oct. 2013, the entire contents of which are hereby incorporated by reference.

BACKGROUND OF THE INVENTION

The invention relates to compositions which inhibit the growth of complex scale, more specifically gypsum scale in aqueous mineral ore slurries, and methods for inhibiting scale in relatively high solids content environments in industrial mining operations. The compositions comprise an active selected from carboxylate polymers, polyamine acids, organic phosphonates and the like.

The mineral industry is a large consumer of chemicals which are used during many stages of the processing of the mineral ore. For example, chemicals are added to inhibit the development of various types of scale which can develop in different stages of ore processing. Different conditions during different unit operations of ore processing systems require different chemicals to inhibit the scale.

The processing of mineral ore is very complex with maintenance required to maintain throughput throughout the process, with maintenance downtime kept to a minimum, thus allowing for more ore to be processed at less cost Unit operations within an industrial mining process involving the formation and/or cooling of mineral ore slurries need constant monitoring, cleaning and maintenance of equipment Examples of such equipment include quench tanks and autoclaves, as well as ancillary lines and equipment. Quench tanks and autoclaves, as well as ancillary lines and equipment, are subject to scaling which if not prevented requires stopping the mining operation and physically removing the scale.

The mining industry is constantly seeking new additive technologies that will increase the efficiency of ore processing during various stages, thus enhancing the overall ore recovery in mineral processing operations. Chemicals, and chemical combinations, have been shown to inhibit scale in aqueous solutions. However, the conditions of the ore change dramatically throughout the processing and the mineral ore in the cooling stages of a quench tank or autoclave operation can have However, the conditions of the ore change dramatically throughout the processing and the mineral ore in the cooling stages of a quench tank or autoclave operation can have high solids content, i.e. in the form of slurry and are not 100% aqueous. New chemicals must be found to enhance mineral ore processing when in the slurry phase. Further, due to increased environmental concerns over mining operations, chemical anti-sealant additives comprising natural materials that provide decreased environmental harm are desired.

All parts and percentages set forth herein are on a weight-by weight basis unless otherwise indicated.

SUMMARY OF THE INVENTION

The compositions useful as anti-sealant controls in mining operations in the aqueous slurry phase comprise an active component selected from the group consisting of carboxylate polymers, polyamine acids, organic phosphonates, and the like, and combinations thereof. The anti-sealant compositions are typically added to mineral slurry in the mining operation in an amount effective to inhibit the formation of scale in pipes and equipment used for ore recovery, for example with respect to a quench tank or autoclave the composition can be added to the slurry in the quench tank or autoclave, and/or in an ancillary line or piece of equipment. Thus, the invention encompasses a mineral ore slurry comprising an aqueous phase having a mineral ore and a anti-sealant composition comprising an active component selected from the group consisting of carboxylate polymers, polyamino acids, organic phosphonates, and the like, and combinations thereof in an amount effective to inhibit scale on the metal, polymer, plastic or ceramic surfaces of the quench tank or autoclave, and/or ancillary line or equipment.

Generally, application of the anti-sealant increases the capacity and throughput of mineral ores in the mining process by inhibiting the build-up of complex scale, in particular gypsum scale, in the interior walls and devices of the equipment and piping. This will benefit operations by decreasing downtime and cost associated with it due to cleaning and maintenance and also helps create a more efficient system by moving more ore slurry through the cooling process in shorter time periods. In addition, the use of the anti-sealant also reduces health and safety risks associated with high frequency quench circuit mechanical de-scaling and increases quench tank circuit equipment life time.

DETAILED DESCRIPTION OF THE INVENTION

The active component of the anti-sealant composition can be selected from carboxylate polymers having the formula $$R^1-CH_2-CH(CO_2H)-R^2-R^3$$

wherein $R^1$ is selected from a functional group, $R^2$ is a polycarboxylate and $R^3$ is hydrogen or a functional group. In embodiments, the functional groups of $R^1$ and $R^3$ comprise sulfonate, sulfate, phosphinate, phosphonate, alcohol, 1,1-diphenyl hexyl, tert-butyl, mercaptoethanol, mercaptopropionic acid, mercaptoglycolic acid and $R^2$ comprises a polyacrylic acid. Typically, the carboxylate polymers will have a molecular weight between about 1,000 g/mol to about 20,000 g/mol, such as between about 2,000 g/mol to about 12,000 g/mol. In an embodiment, the carboxylate polymer comprises polyacrylic acid.

In one aspect, the active component of the anti-sealant composition can be selected from polyamine acids having the formula $$poly(X)_m poly(Y)_n,$$

wherein X and Y are independently selected from the group consisting of an amino acid, a salt of an amino acid and an amino acid derivative, and m can be from about 2 to about 60, n can be up to about 60, and the sum of m and n is at least about 5. For example, X and Y may be independently selected from the group consisting of aspartic acid, glutamic acid, lysine, aspartate, glutamate, a salt of lysine, an aspartate derivative, a glutamate derivative, and a lysine derivative; m can be from about 5 to about 12; n can up to about 12 and the sum of m and n can be from about 5 to about 12. In one aspect the polyamine acid can comprise polyaspartic acid.

The active component of the anti-sealant composition can be selected from organic phosphonates. In particular, the organic phosphonate may be selected from the group consisting of hexamethylene diamine tetra(methylene phosphonic acid) ("HDTMPA"), diethylenetriamine penta(methylene phosphonic acid) ("DETPMPA"), bis(hexamethylene triamine penta(methylene phosphonic acid) ("BH-MTPMPA") and the like, and combinations thereof. The anti-sealant composition is useful to control complex scale, such as gypsum scale, in mining operations. Typically, the process comprises the steps of adding to the aqueous mineral ore slurry having an aqueous phase an effective scale inhibiting amount of a scale inhibiting composition comprising an active component selected from the group consisting of i) a carboxylate polymer having the formula $R^1$—$CH_2$—$CH(CO_2H)$—$R^2$—$R^3$ wherein $R^1$ is selected from the group consisting of sulfonate, sulfate, phosphinate, phosphonate, alcohol, 1,1-diphenyl hexyl, tert-butyl, mercaptoethanol, mercaptopropionic acid, mercaptoglycolic acid, $R^2$ is i) a polycarboxylate, and $R^3$ is H or $R^1$; ii) a polyamine acid having the formula: poly(X)mpoly(Y)n, wherein X and Y are independently selected from the group consisting of an amino acid, a salt of an amino acid and an amino acid derivative, and m can be from about 2 to about 60, n can be up to about 60, and the sum of m and n is at least about 5; and iii) an organic phosphonate; wherein the pH of the slurry is below 9.0 and the complex scale comprises gypsum.

In an embodiment of the invention, the pH can be from about 3.0 to about 9.0, typically greater than about 4.0 to about 9.0, can be from about 4.5 to about 9.0, and may be from about 5.0 to about 8.0. The process may be applied to mineral ore slurries with mineral ore having temperatures of up to about 550° C., can be up to about 450° C., can be up to about 400° C., may be from about 40° C. to about 550° C., or from about 40° C. to about 450° C. Persons of ordinary skill in these arts, after reading this disclosure, will appreciate that all ranges and values for the pH and temperature ranges are contemplated. With respect to the active component of the anti-sealant composition, any of the active compounds discussed in this Specification may be used in the process.

The anti-sealant composition described herein may be used for controlling complex scale, typically gypsum scale, in mineral ore slurry forming and cooling operations; such as an ore quench operation or an autoclave operation, including any associated piping or ancillary equipment. In some aspects, such processes may comprise the steps of a) providing an ore quench tank having a vessel with an interior surface or an autoclave having an interior surface, at least one feed line having an interior surface and at least one discharge line having an interior surface; b) providing a mineral ore slurry comprising mineral ore and an aqueous phase; c) adding to the mineral ore slurry an effective amount of a scale inhibiting composition comprising an active component selected from the group consisting of i) a carboxylate polymer having the formula:

$R^1$—$CH_2$—$CH(CO_2H)$—$R^2$—$R^3$, wherein $R^1$ can be selected from the group consisting of a sulfonate, sulfate, phosphinate, phosphonate, an alcohol, 1,1-diphenylhexyl, tert-butyl, mercaptoethanol, mercapto propionic acid, mercaptoglycolic acid, $R^2$ is i) a polycarboxylate, and $R^3$ is H or $R^1$; ii) a polyamine acid having the formula:

poly(X)$_m$Poly(Y)$_n$, wherein X and Y are independently selected from an amino acid and m is about 2 to about 60, n is up to about 60, and sum of m and n is at least about 5; and iii) an organic phosphonate, and wherein the pH of the mineral ore slurry in the vessel is below 9.0, can be from about 3.0 to about 9.0, can be greater than about 4.0 to about 9.0, can be from about 4.5 to about 9.0, can be from about 5.0 to about 8.0, and may be from about 7.0 to about 8.5.

In some aspects, the temperature of the mineral ore in the slurry, particularly in the quench tank, is up to about 550° C., can be up to about 450° C., can be up to about 400° C., from about 40° C. to about 550° C., or from about 40° C. to about 450° C. In some aspects the temperature ranges of the mineral ore in the slurry in an autoclave can be up to about 220° C., can be up to about 190° C., with a typical temperature gradient of from about 80° C. to about 220° C., like about 80° C. to about 190° C. Persons of ordinary skill in these arts, after reading this disclosure, will appreciate that all ranges and values for the pH and temperature ranges are contemplated. With respect to the active component of the anti-sealant composition useful in this process, any of the active compounds discussed in this Specification may be used in the process.

Typically, the solids content of the mineral ore slurry, that is the amount of mineral ore (mineral ore content) in the slurry, is at least about 8%, at least about 10%, at least about 20%, at least about 30%. For example, the mineral ore slurry may have a solids content of about 8% to about 30%, including about 10% to about 20%, such as about 10% to about 15%. Persons of ordinary skill in these arts, after reading this disclosure, will appreciate that all ranges and values for the solids content are contemplated.

The mineral ore slurry generally comprises a mineral ore having a component selected from the group consisting of a precious metal, a base metal and combinations thereof. The mineral ore slurry can comprise a mineral selected from the group consisting of gold, aluminum, silver, platinum, copper, nickel, zinc, lead, molybdenum, cobalt, and the like, and combinations thereof. The mineral ore slurry may farther comprise one or more of quartz, dolomite, calcite, gypsum, barite or muscovite, and the like, and combinations thereof.

The mineral ore slurry can comprise from about 5 ppm to about 300 ppm of the active component in the scale inhibiting composition per the aqueous phase. In some embodiments, the amount of active may be from about 15 ppm to about 250 ppm, can be from about 20 ppm to about 100 ppm, and may be from about 25 ppm to about 50 ppm. Persons of ordinary skill in these arts, after reading this disclosure, will appreciate that all ranges and values for the amount of active component are contemplated.

The complex scale, such as gypsum, may be present on the interior surface of at least one feed line, the interior surface of the vessel of the quench tank or autoclave, the interior surface of at the least one discharge line or combinations thereof, as well as on any internal mechanisms or devices. The scale inhibiting composition can be added to the mineral ore slurry in at least one feed line, in at least one discharge line, in the vessel of the quench tank or in the autoclave or combinations thereof.

Figure 1:
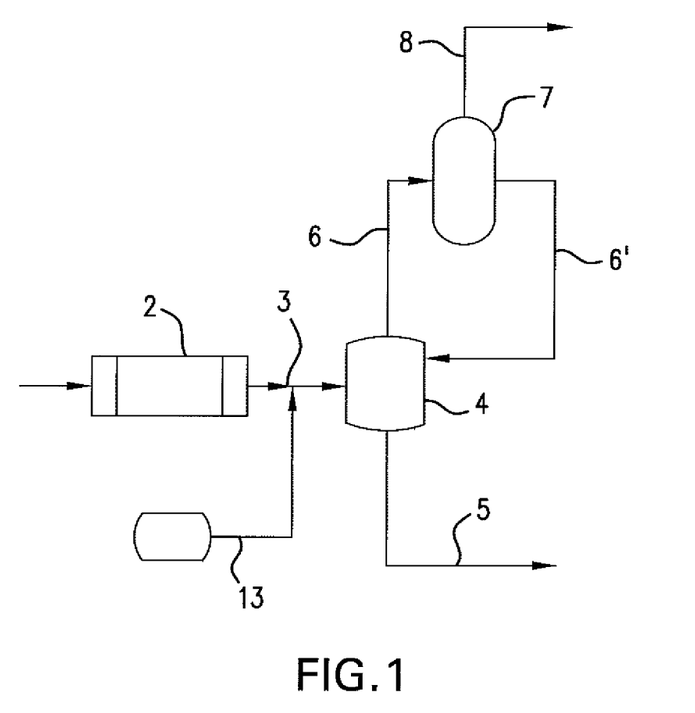
FIG. 1 shows a typical mineral ore quenching operation in an embodiment of the invention.

An ore quenching operation, particularly applied with recovery of minerals and precious metals in the case of gold ore, is illustrated in FIG. 1. In the quenching operation 1, hot, dry calcine from an upstream unit operation, typically a roaster (not shown) is processed to a calcine cooler 2. After cooling, the calcine is fed through a feed line and/or launder line 3 to the quench tank 4. In the operation shown in FIG. 1, water is added to the calcine in the feed line and/or launder line 3 via cooling water feed pipe 13 prior to the quench tank 4 to form the mineral ore slurry that is cooled in the quench tank 4. After cooling, the mineral ore slurry exits the quench tank 4 through a discharge line 5 to downstream unit operations. Optionally, a portion of the aqueous phase of the mineral ore slurry may be circulated by pipes 6 and 6' from the quench tank to a scrubber 7 and back as part of the operation. Gaseous material can be vented from the scrubber through a vent pipe 8. In an alternative method, not shown, water is added to the calcine to form the mineral ore slurry in the vessel of the quench tank 4 and not in the feed line and/or launder line 3.

Alternative quenching operations comprise at least one preliminary quench device comprising a preliminary quench device vessel having a preliminary quench device vessel interior wall and providing water and hot, dry calcine wherein the water is added to the calcine in the preliminary quench device vessel to form the mineral ore slurry and complex scale is on the preliminary quench device vessel interior wall. In a further embodiment, the water is added to the vessel of the quench tank to form the mineral ore slurry instead of the in the preliminary quench device. The mineral ore slurry is transported to the quench tank from the preliminary quench device by the feed line and/or launder line. In these embodiments the scale inhibiting composition is generally added to the mineral ore slurry in the preliminary quench device vessel, the feed line and/or launder line, or can be added directly to quench tank and piping section coming out of quench tank depending on severity of scale formation and location of severe zones of scale formation, or combinations thereof.

Figure 2:
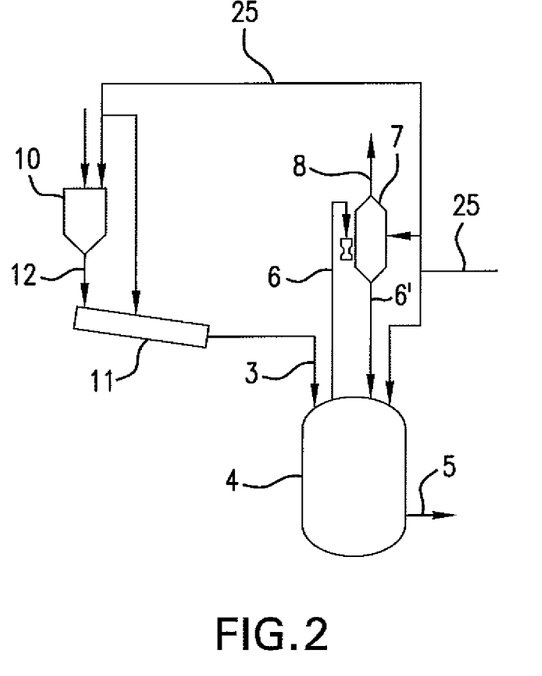
FIG. 2 shows typical mineral ore quenching operation comprising preliminary quench devices in an embodiment of the invention.

FIG. 2 illustrates a mineral ore quenching operation 9 comprising two preliminary quench devices. In this operation 9, hot, dry calcine is transported from an upstream unit operation to first preliminary quench device 10. One skilled in the art will recognize that the first preliminary quench device will comprise a first preliminary quench device vessel having a first preliminary quench device vessel interior wall. Water is added to the hot, dry calcine in first preliminary quench device 10, typically within preliminary quench device vessel, to form the mineral ore slurry. The mineral ore slurry is conveyed from the first preliminary quench device 10 to a second preliminary quench device 11 through a means 12 to convey mineral ore slurry from the first preliminary quench device 10 to the second preliminary quench device 11 which, as one skilled in the art will appreciate, has a conveyance means interior wall. Typically, the means 12 is a pipe. One skilled in the art will also recognize that the second preliminary quench device 11 comprises a second preliminary quench device vessel having a second preliminary quench device vessel interior wall. Some cooling of the mineral ore slurry occurs in second preliminary quench device 11. After the second preliminary quench device 11 the mineral ore slurry undergoes similar processing as that shown in FIG. 1, however the mineral ore slurry is not formed in the feed line or launder line 3. The mineral ore from the second preliminary quench device 11 is sent to the quench tank 4 through feed line or launder line 3. After cooling, the mineral ore slurry exits the quench tank 4 through a discharge line 5 to downstream unit operations. Optionally, a portion of the water phase of the mineral ore slurry may be circulated by pipes 6 and 6' from the quench tank to a scrubber 7 and back to quench tank 4 as part of the operation. Gaseous material can be vented from the scrubber through a vent pipe 8. Cooling water may be added through pipe system 25 to one or more of the first preliminary quench device 10, second preliminary quench device 11 and quench tank 4 and scrubber 7. In this method, the scale inhibiting composition may be added to the mineral ore slurry in the first preliminary quench tank device 10, the second preliminary quench device 11, the means 10, feed line or launder line 3 or quench tank 4. Complex scale may form on the first preliminary quench device vessel interior wall, the second preliminary quench device vessel interior wall, conveyance means interior wall or combinations thereof, in addition to the mechanisms and internal components of the mineral ore quenching operation discussed above, including those discussed with the operation shown in FIG. 1.

Although FIG. 2 illustrates and operation comprising a first preliminary quench device 10 and a second preliminary quench device 11, operations comprising one or more than two of such devices, such as 3, 4, 5, 6, 7, 8, 9, 10, 11, 12 or more preliminary quench devices, are within the scope of the invention.

In some aspects, the temperatures of the for hot calcine ore entering the quench tank are very high, such as up to about 550° C. and can be up to about 450° C. Typically, within the vessel, of the quench tank the temperature gradient for calcine can range from about 40° C. to about 550° C., can be from about 40° C. to about 450° C., with higher temperatures towards the top of quench tank. However, due to very short period of time for calcine slurry residence in the quench tank vessel and low pressure, the slurry aqueous phase bulk temperature should be not be higher than about 100° C.

Figure 3:
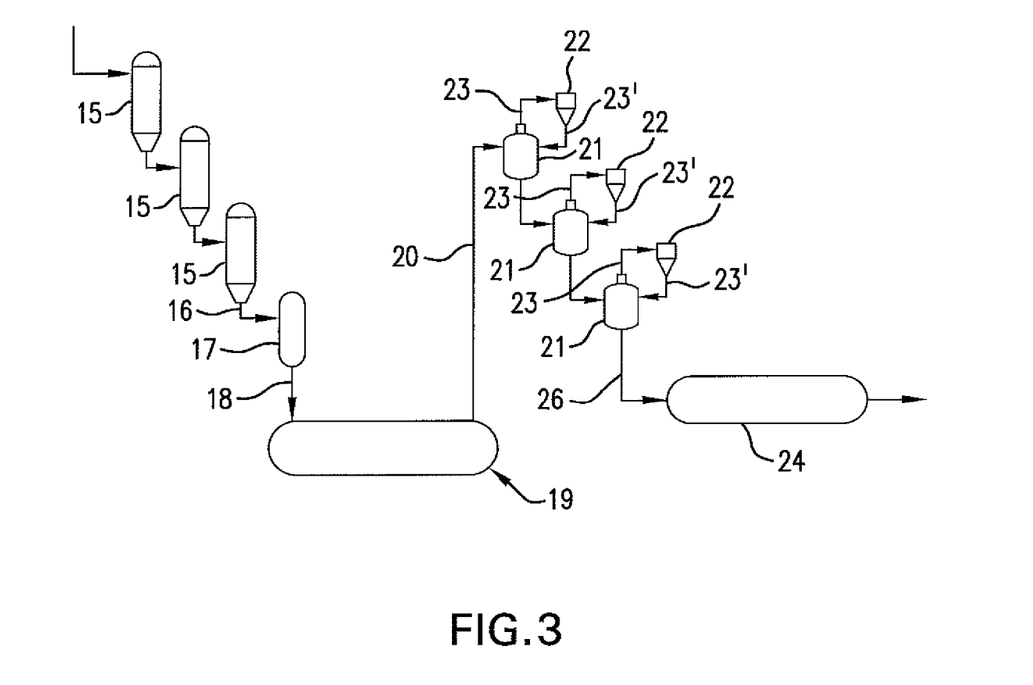
FIG. 3 shows a typical mineral ore autoclave operation in an embodiment of the invention.

FIG. 3 shows a typical autoclave process 14 used to for mineral ore slurries. Typically, these processes will be applied to oxidize mineral ore slurry comprising acid, such as sulfuric acid, using oxygen in a high pressure and temperature environment prior to leaching the mineral from the ore in aJ so called acid oxidation autoclave processes. Also, the circuits described herein may be used in alkaline oxidation autoclave processes. The anti-sealant compositions described herein can be used in both acid oxidation autoclave processes and alkaline oxidation autoclave processes. As shown in FIG. 3, mineral ore slurry is mixed with acid or base upstream of the autoclave and the mineral ore slurry enters one or more heating towers 15, which as shown in FIG. 3 may be in series, to preheat the slurry. The preheated slurry may then be sent through a heating tower discharge line 16 as shown in FIG. 3 to a condenser 17 and then to a feed line 18 to the autoclave 19. One skilled in the art will appreciate that the condenser 17 is optional and the mineral ore slurry can be sent through the feed line 18 to the autoclave 19 directly from a heating tower 15. Oxygen and steam may be added to the autoclave 19 such as in an acid oxidation autoclave process to oxidize the mineral ore slurry to oxidize sulfide material in the slurry, at high temperatures and pressure. The mineral ore slurry exits the autoclave 19 through a discharge line 20 to one or more cooling towers 21, which as shown in FIG. 3 may be in series, in which the slurry is cooled, for example, passing through flash cooling towers and then sent to downstream operations. Optionally, water phase from the mineral ore slurry may be circulated through a cyclone 22 through pipes 23 and 23'. Also, in certain embodiments, the mineral ore slurry may be processed via a heat exchanger feed line 26 through one or more heat exchangers 24 to further reduce slurry temperature prior to downstream processing. Typically, after the autoclave operation and subsequent cooling the mineral ore slurry undergoes neutralization and/or leaching. One skilled in the art will appreciate that although three heating towers and cooling towers and one autoclave are depicted in FIG. 3, the invention encompasses processes independently having any number of heating towers, cooling towers or autoclaves. Each of the pieces of equipment in the autoclaving operation such as shown in FIG. 3, including the heating towers 15, heating tower discharge line 161 condenser 17, feed line 18, autoclave 19, cooling towers 21, heat exchanger feed line 26 and heat exchanger 24, as well as other equipment and lines, will have interior surfaces or interior walls and possibly other mechanisms such as stirrers and heat exchange devices. Scale, such as gypsum scale, may form on any of the interior surfaces or walls or the surfaces of any internal devices exposed to the mineral ore slurry and any other associated equipment, pipes and lines.

The temperature of the mineral ore of the acidified mineral ore slurry in the pressurized autoclave is high, such as up to about 220° C., can be up to about 190° C. Typically, within the autoclave the temperature range for the mineral ore can be from about 80° C. to about 250° C. and may be from about 80° C. to about 190° C. The pressure in autoclave operation can vary from about 400 kPa to about 4,000 kPa. Similar temperatures, but typically in a lower range specified above, may be experienced in the other equipment and piping associated with the autoclaving operation, such as, for example, the heating towers 15, condenser 17, cooling towers 21, a'":ld heat exchanger 24 and the associated equipment, pipes and lines. In alkaline oxidation autoclave process and slurry cooling circuits the typical pH range for ore slurry, discharged from high pressure autoclave, is below 9.0, more specifically between about 7.0 and about 8.5.

EXAMPLES

In the Examples, scale inhibition was analyzed using a Model KS 4000 ic IKA shaker bath with a set of 16 10 oz jars. The details of equipment, reagents and protocol are described below.

Examples 1-15

Mimic water, that is water having salt content typically found in mining operations, particularly gold mines, was made by combining de-ionized water with the following salts: $CaCl_2.2H_2O$, $MgSO_4.7H_2O$, $Na_2SO_4$, $Al_2(SO_4)_3$, $FeSO_4.7H_2O$, $CuSO_4.7H_2O$. The composition of the mimic water after gypsum formation is set forth in Table 1.

TABLE 1

| | | Mimic water composition | | | | | |
|---|---|---|---|---|---|---|---|
| Wt % Gypsum | Calcium, ppm | Magnesium, ppm | Chlorides, ppm | Sulfates, ppm | $Al_3$, ppm | $Cu^{2+}$, ppm | Fe2+, ppm |
| 0.75 | 5690 | 3806 | 4034 | 10926 | 1.0 | 3.8 | 1.0 |

Where: Ca and Mg amounts are expressed as $CaCO3$ and $MgCO3$ respectively. Gypsum wt % corresponds to total amount of gypsum formed in situ in mimic water.

The mimic water was composed of proper salts to set gypsum scale in situ formation, with a small amount of polyvalent ions added. Gypsum scale super saturation ratio was kept constant for all examples.

For each Example 1-15, mimic water set forth in Table 1 was added to jars with the type and amount of scale inhibiting composition set forth in Table 2. Two jars with only mimic water and no scale inhibiting composition (controls) were also made up for comparison. The jars were placed in the IKA shaker bath with revolutions per minute ("rpm") kept constant at 130 rpm and a temperature of 60° C. with pH at 5.5 to 6.0. The tests typically lasted 16 to 18 hours to ensure sufficient time to reach the state of equilibrium for scale formation. The percent inhibition by mass was calculated using a proprietary mass balance method applied to Ashland's scale deposition test. The water, after filtering out of suspended scale/slurry, was submitted to ICP analysis and threshold inhibition was measured using ICP analysis by the amount of soluble Ca-ion and calculated by:

$$\frac{\text{Conc. of Cain treated Jars (ppm)} - \text{Conc. of Cain Blank (ppm)}}{\text{Total amount of Caused (control run every test)(ppm)} - \text{Conc. of Cain Blank (ppm)}}$$

The results of percent (%) inhibition by ICP and percent (%) inhibition by mass of scale deposited are set forth in Table 2. All tests have been repeated 2 to 4 times on average to achieve good reproducibility.

TABLE 2

Deposition and threshold inhibition data for scale inhibiting products in mimic water

| Example# | Product | Product | % Inhibition ICP | % Deposition Inhibition by Mass |
|---|---|---|---|---|
| Comparative 1 | 50 ppm in water | Polystabil AN (Batch | 72.37 | 95.58 |
| Comparative 2 | 25 ppm in water | Polystabil AN (Batch | 0.00 | 0.00 |
| Comparative 3 | 50 ppm in water | Baypure | 71.37 | 96.15 |
| Comparative 4 | 25 ppm in water | Baypure | 0.00 | 17.52 |
| Comparative 5 | 50 ppm in water | Mayoquest 1635 | 72.33 | 97.48 |
| Comparative 6 | 25 ppm in water | Mayoquest 1635 | 0.00 | −3.94 |
| Comparative 7 | 50 ppm in water | Polystabil AN (Batch | 54.78 | 74.12 |
| Comparative 8 | 25 ppm in water | Polystabil AN (Batch | 0.00 | −2.48 |
| Comparative 9 | 50 ppm in water | Dequest 2066 | 5.70 | −3.54 |
| Comparative 10 | 25 ppm in water | Dequest 2066 | 0.00 | 41.46 |
| Comparative 11 | 50 ppm in water | Drew 11-664 | 2.23 | −11.59 |
| Comparative 12 | 50 ppm in water | Cublen 45 | 2.55 | −18.01 |
| Comparative 13 | 50 ppm in water | Degapas 1105N | 11.69 | 34.78 |
| Comparative 14 | 50 ppm in water | Polystabi I ANA | 35.39 | 76.24 |
| Comparative 15 | 50 ppm in water | Polystabil VZK | 52.70 | 80.66 |
| Comparative 16 | 50 ppm in water | Polystabil AN | 25.06 | 49.25 |

In Table 2, product amount is expressed in ppm (parts per million or mg/L) of active ingredient per mimic water phase. Soluble Ca ion was measured by ICP. Total scale deposited, mass percent, was measured by a proprietary method.

The results summarized in Table 2 show a broad range of scale inhibition efficacy by both deposition and threshold mechanisms. Threshold inhibition varies from 0% to 100%. Polyacrylate, polyaspartate and organic phosphonate, HDT-MPA, acid salts showed the best efficacy.

Examples 17-27

In Examples 17-27, dried mine slurry relevant to a quench tank circuit and having the compositions set forth in Tables 3 and 4 was re-dispersed at a given weight percent dose levels in water to obtain aqueous slurries.

TABLE 3

Slurry composition, Case 1

| Slurry Components (Dry) | Wt % |
| --- | --- |
| Quartz | 67% |
| Dolomite | 9% |
| Calcite | 6% |
| Gypsum | 5% |
| Barite | 2% |
| Muscovite | 11% |

TABLE 4

Slurry composition, Case 2

| Slurry Components (Dry) | Wt % |
| --- | --- |
| Quartz | 61% |
| Dolomite | 18% |
| Calcite | 3% |
| $CaSO_4 \cdot H_2O$ | 8% |
| Barite | 8% |
| Muscovite | ~1% |

In Examples 17-27, gold ore was added to the slurry described in Table 3 (Case 1) to obtain slurries having a gold ore (solids) content of 10% by weight. The slurries containing gold ore were placed in the jars as described above and the type and amount of scale inhibiting composition was added. The jars were then placed in the IKA shaker bath and processed as described above for Examples 1-16. Two control jars were also processed. After processing scale inhibition was measured using ICP analysis as described above and the results are set forth in Table 5.

TABLE 5

Threshold inhibition data for scale inhibiting products in mimic water with 10 wt % gold ore slurry, Case 1.

| Example# | Product Amount* | Product Type | % Inhibition ICP |
| --- | --- | --- | --- |
| 17 | 25 ppm in water | Polystabil AN (Batch | 75 |
| 18 | 25 ppm in water | Baypure | 53 |
| 19 | 25 ppm in water | Mayoquest 1635 | 36 |
| 20 | 25 ppm in water | Polystabil AN (Batch | 33 |
| 21 | 25 ppm in water | Dequest 2066 | 19 |
| 22 | 25 ppm in water | Drew 11-664 | 16 |
| 23 | 25 ppm in water | Cublen 45 | 14 |
| 24 | 25 ppm in water | Degapas 1105N | 11 |
| 25 | 25 ppm in water | Polystabil ANA | 7 |
| 26 | 25 ppm in water | Polystabil VZK | 6 |
| 27 | 25 ppm in water | Polystabil AN | 3 |

*In Table 5, product amount is expressed in ppm (parts per million or mg/L) of active ingredient per aqueous phase in mimic water, containing 10 wt % gold ore slurry. Soluble Ca ion was measured by ICP.

Polyacrylate, polyaspartate and organic phosphonate, HDTMPA, acid salts showed good efficacy, while tested at half a dose level compared to mimic water conditions (Examples 1-16). The presence of suspended slurry unexpectedly enhanced inhibition.

Examples 28-44

In Examples 28-44, gold ore was added to the aqueous mimic water with the ore composition described in Table 4 (Case 2) to obtain slurries having gold ore (solids) content of 10% by weight and 15% by weight. The slurries containing gold ore were placed in jars described above and the type and amount of scale inhibiting composition was added. The jars were then placed in the IKA shaker bath and processed as described above for Examples 1-16. Two control jars were also processed. After processing, scale inhibition was measured using ICP analysis as described above and the results are set forth in Table 6.

TABLE 6

Threshold inhibition data for scale inhibiting products in mimic water with 10 wt % and 15 wt % (high solids) gold ore slurry, Case 2

| Example# | Product Amount* | Product Type | % Inhibition ICP |
| --- | --- | --- | --- |
| 28 | 50 ppm in water | Polystabil AN (Batch 16763) | 49 |
| 29 | 50 ppm in water (high solids) | Polystabil AN (Batch 16763) | 45 |
| 30 | 50 ppm in water | Baypure | 55 |
| 31 | 50 ppm in water (high solids) | Baypure | 37 |
| 32 | 50 ppm in water | Mayoquest 1635 | 62 |
| 33 | 50 ppm in water (high solids) | Mayoquest 1635 | 16 |
| 34 | 50 ppm in water | Polystabil AN (Batch 16764) | 45 |
| 35 | 50 ppm in water | Dequest 2066 | 27 |
| 36 | 50 ppm in water | Drew 11-664 | 8 |
| 37 | 50 ppm in water | Cublen 45 | 21 |
| 38 | 50 ppm in water (high solids) | Cublen 45 | 3 |
| 39 | 50 ppm in water | Degapas 1105N | 47 |
| 40 | 50 ppm in water | Polystabil ANA | 4 |
| 41 | 50 ppm in water | Polystabil VZK | 58 |
| 42 | 50 ppm in water (high solids) | Polystabil VZK | 35 |

TABLE 6-continued

Threshold inhibition data for scale inhibiting products in mimic water with 10 wt % and 15 wt % (high solids) gold ore slurry, Case 2

| Example# | Product Amount* | Product Type | % Inhibition ICP |
|---|---|---|---|
| 43 | 50 ppm in water | Polystabil AN | 45 |
| 44 | 50 ppm in water (high solids) | Polystabil AN | 27 |

*Where product amount is expressed in ppm (parts per million or mg/L) of active ingredient per aqueous phase in mimic water, containing either 10 wt % or 15 wt % gold ore slurry. Soluble Ca ion was measured by ICP. Note that (high solids) are slurries having 15% by weight gold ore (solids) content, others without any notation as to solids have 10% by weight gold ore (solids) content.

Polyacrylate, organic phosphonate and polyaspartate show good inhibition performance. Organic phosphonate and polyaspartate performance decreases with the increase in the solids content, while polyacrylate product retains essentially the same inhibition performance as in the prior examples (17-27). This indicates that slurry type, composition and amount have an impact on scale inhibition.

We claim:

1. A process for preventing/inhibiting/controlling complex scale in mining operations comprising: adding to an aqueous mineral ore slurry having a solids content of at least 10%, a scale inhibiting composition in an amount of from about 5 parts-per-million (ppm) to about 300 ppm, wherein the scale inhibiting composition comprises an active component selected from
  a) a carboxylate polymer having the formula $R^1$—$CH_2$—$CH(CO_2H)$—$R^2$—$R^3$ wherein R1 is selected from the group consisting of sulfonate, sulfate, phosphonate, alcohol, 1,1-diphenylhexyl, tert-butyl, mercaptoethanol, mercaptopropionic acid, and mercaptoglycolic acid; $R^2$ is a polycarboxylate; and $R^3$ is H or $R^1$; or
  b) a polyamine acid having the formula $poly(X)_m poly(Y)_n$ wherein X and Y are independently selected from the group consisting of an amino acid, a salt of n amino acid and an amino acid derivative, m can be from about 2 to about 60, n can be up to about 60, and the sum of m and n is at least about 5; and
    wherein the pH of the mineral ore slurry is below 9.0 and the complex scale comprises gypsum.

2. The process of claim 1, wherein the mineral ore slurry comprises a mineral selected from the group consisting of gold, aluminum, silver, platinum, copper, nickel, zinc, lead, molybdenum, cobalt and combinations thereof.

3. The process according to claim 1, wherein the mineral ore slurry further comprises quartz, dolomite, calcite, gypsum, barite or muscovite.

4. The process according to claim 1, wherein the mineral ore slurry comprises from about 5 ppm to about 300 ppm of the active component in the scale inhibiting composition per the aqueous phase.

5. The process according to claim 1, wherein the carboxylate polymer has a weight average molecular weight of about 1,000 grams/mol to about 20,000 grams/mol.

6. The process according to claim 1, wherein the polycarboxylate is polyacrylic acid.

7. The process according to claim 1, wherein X and Y are independently selected from the group consisting of aspartic acid, glutamic acid, lysine, aspartate, glutamate, a salt of lysine, an aspartate derivative, a glutamate derivative, and a lysine derivative; m is about 5 to about 12; n is up to about 12 and the sum of m and n is about 5 to about 12.

8. The process according to claim 1, wherein the polyamine acid is polyaspartic acid.

9. The process according to claim 1, wherein the organic phosphonate is selected from the group consisting of hexamethylenediamine tetra (methylene phosphonic acid), diethylenetriamine penta(methylene phosphonic acid) and bis(hexamethylene triamine penta(methylene phosphonic acid).

* * * * *

UNITED STATES PATENT AND TRADEMARK OFFICE
CERTIFICATE OF CORRECTION

PATENT NO. : 9,719,008 B2
APPLICATION NO. : 14/510616
DATED : August 1, 2017
INVENTOR(S) : Bakeev et al.

It is certified that error appears in the above-identified patent and that said Letters Patent is hereby corrected as shown below:

- At Column 1, Line 16; Column 2, Line 56; Column 3, Lines 3 and 26; Column 4, Line 2; Column 11, Line 36; and Column 12, Line 37: "polyamine acid" should read --polyamino acid--

- At Column 1, Lines 54, 61, and 65; Column 2, Lines 7, 13, 22, 40 and 55; Column 3, Lines 5, 13, 45, and 48; Column 4, Line 26; and Column 6, Line 41: "anti-sealant" should read --anti-scalant--

- At Column 4, Line 44: "farther" should read --further--

- At Column 6, Line 23: "for" should be deleted

- At Column 6, Line 39: "aJ" should be deleted

- At Column 7, Line 18: "mineral ore of the acidified" should be deleted

- At Column 7, Line 29, "a"""":ld" should be deleted

- At Column 8, Lines 37, 38 and 40, "Cain" should read --$Ca^{2+}$--

- In Table 2, Example #, Comparative 1; Comparative 2; Comparative 7; and Comparative 8: "(Batch" should be deleted

- In Table 5, Example #, 17 and 20: "(Batch" should be deleted

- In Table 6, Example #, 28 and 29: "(Batch 16763)" should be deleted

- In Table 6, Example #, 34: "(Batch 16764)" should be deleted

- At Column 3, Line 1: "n can up to about" should read --n can be up to about--

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,719,008 B2

- At Column 6, Line 23: "for" should be deleted

- At Column 6, Line 34: "to" should be deleted

- At Column 11, Table 6-continued, the annotation under the Table: "*Where product amount is expressed In ppm..." should read --Where product is expressed in ppm--

- At Column 11, Line 39: "a salt of n amino acid..." should read --a salt of an amino acid--